United States Patent
Weinmann et al.

(10) Patent No.: US 6,367,767 B2
(45) Date of Patent: *Apr. 9, 2002

(54) CONTROL MEMBER FOR A PIEZO-VALVE

(75) Inventors: Michael Weinmann, Plüderhausen; Michael Jentschke, Aichwald; Markus Hoffmann, Wolfschlugen, all of (DE)

(73) Assignee: Festo AG & Co., Esslingen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,294

(22) Filed: Oct. 28, 1999

(30) Foreign Application Priority Data

Nov. 6, 1998 (DE) ..................... 298 19 856 U

(51) Int. Cl.[7] ............................................. F16K 1/226
(52) U.S. Cl. .................................. 251/129.06; 251/357
(58) Field of Search ........................ 251/129.06, 357, 251/84, 85; 137/625.65

(56) References Cited

U.S. PATENT DOCUMENTS

| | | | | |
|---|---|---|---|---|
| 3,532,121 A | * | 10/1970 | Sturman ................... 251/65 X |
| 4,142,553 A | * | 3/1979 | Sakakibara et al. ....... 251/11 X |
| 4,211,257 A | * | 7/1980 | Sakakibara et al. .... 137/625.65 |
| 4,285,497 A | * | 8/1981 | Guttel ............... 137/625.65 X |
| 4,527,590 A | * | 7/1985 | Kolze ................ 137/625.65 X |
| 4,607,662 A | * | 8/1986 | Hama et al. ........... 137/625.65 |
| 4,617,952 A | * | 10/1986 | Fujiwara et al. .... 251/129.06 X |
| 4,765,370 A | * | 8/1988 | Ariizumi et al. ....... 137/625.65 |
| 5,343,894 A | * | 9/1994 | Frisch et al. ........ 251/129.06 X |
| 5,779,218 A | * | 7/1998 | Kowanz ................ 251/129.06 |
| 5,799,696 A | * | 9/1998 | Weiss ................ 137/625.65 X |
| 6,017,016 A | * | 1/2000 | Jackson ................. 251/129.06 |
| 6,164,621 A | * | 12/2000 | Bouchard et al. ....... 251/129.06 |

FOREIGN PATENT DOCUMENTS

| | | |
|---|---|---|
| DE | 37 33 890 A1 | 4/1989 |
| DE | 297 18 306 U1 | 3/1998 |
| EP | 0 170 990 | 2/1986 |

* cited by examiner

*Primary Examiner*—Kevin Shaver
*Assistant Examiner*—Eric Keasel
(74) *Attorney, Agent, or Firm*—Hoffmann & Baron, LLP

(57) ABSTRACT

A control member for a piezo-valve having an elongated flexible element, which at one of its two axial ends has a respective sealing face on oppositely placed longitudinal side faces. The two sealing elements are a common component of a sealing body, which possesses a connecting section extending between the two sealing elements and formed integrally with same, such connecting section having an opening of the flexible element extending through it. The two sealing elements overlap the marginal section, delimiting the opening, of the flexible element and in the peripheral part of the opening engage the respectively associated longitudinal side face of the flexible element.

6 Claims, 2 Drawing Sheets

CONTROL MEMBER FOR A PIEZO-VALVE

BACKGROUND OF THE INVENTION

The invention relates to a control member for a piezo-valve, comprising an elongated flexible element, which at one of its two axial ends on opposite longitudinal side faces respectively possesses a sealing element having a sealing face.

THE PRIOR ART

A control member of this type is for example disclosed in the European patent publication 0 170 990 A1. Here it is part of a piezo-valve belonging to a vacuum control device, it having an elongated flexible element termed a flexure transducer held at one axial end in a manner fixed in relation to the housing and at its other axial end is provided on mutually opposite longitudinal side faces with a respective sealing element, which is opposite to the port or end of a fluid duct. By the application of a voltage to the flexible element the latter is deformed so that a sealing face provided on one of the two sealing elements is selectively brought into contact with a valve seat surrounding the duct port or end.

In the case of the known piezo-valve the two sealing elements are mounted on the flexible element and probably bonded thereto. This means that inaccuracies in manufacture and assembly will make themselves felt at the two sealing elements and will be cumulative in effect and will mean that the distances between the two sealing faces may vary and this will impair operation of the piezo-valve. Because the displacement of the flexible element occurring in the course of operation is generally extremely small, even small dimensional errors will have a disastrous effect and will f. i. render necessary a complex resetting of the nozzles in relation to the flexible element.

SHORT SUMMARY OF THE INVENTION

One object of the invention is to provide a control member of the type initially mentioned, which renders possible simple but nevertheless more accurate manufacture.

In order to achieve these and/or other objects appearing from the present specification, claims and drawings, in the present invention the two sealing elements are common components of a sealing body, which possesses a connecting section extending between the two sealing elements and designed integrally with the same, such connecting section extending through an opening in the flexible element, the two sealing elements fitting around an edge section, which delimits the opening, of the flexible element and in the peripheral region of the opening resting against a respectively associated longitudinal side face of the flexible element.

It is in this manner that the two sealing elements are collected together in a common sealing body, the elements being connected together via the connecting section so that there is a set distance between the two sealing faces, which may be established even during the production of the sealing body. In this respect there is also more especially the possibility of treating the sealing body at its sealing faces, as required, mechanically and/or thermally independently of the flexible element and without the material of the flexible element being impaired. Since in the mounted state (owing to the sealing elements overlapping the edge section delimiting the opening) there is a mechanical anchoring of the sealing body on the flexible element, and simple and accurate assembly and fitting becomes possible, it is possible to ensure that the distance present between the two sealing faces is not changed and inaccuracy due to assembly is small. It will be clear that the flexible element will be designed in accordance with the opening, the position or layout of any electrodes necessary for operation being more particularly a factor which facilitates producing the opening.

Further advantageous developments of the invention are defined in the claims.

It would in principle be possible to design the opening in the form of a hole with a complete periphery, into which the sealing body is thrust like a button which more especially in this case should have rubber-like properties. An even simpler design is however one in which the opening, through which the connecting section of the sealing body extends, in the flexible element is open or interrupted at its edge in order to permit plugging in of the sealing body through the interruption in the edge or boundary of the opening. In this respect it is an advantage for reasons of symmetry for the edge interruption of the opening to be on the axially oriented end face of the flexible element.

More particularly in cases in which no adequate, secure attachment can be provided, it is recommended to have an additional adhesive bond between the sealing body and the flexible element.

The dimensions of the connecting section may be so selected that the two sealing elements are braced against the flexible element.

The sealing faces may be provided directly on the respectively associated sealing element so that they constitute an integral component of the sealing body. However as an alternative in this respect a particularly advantageous design is one in which the sealing faces are provided on separate sealing face parts and such sealing face parts are on the integral sealing body. It is then possible for the sealing body to be designed in an optimum fashion as regards its holding function on the flexible element and independently of this to select the best suited material for the sealing faces.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 3:
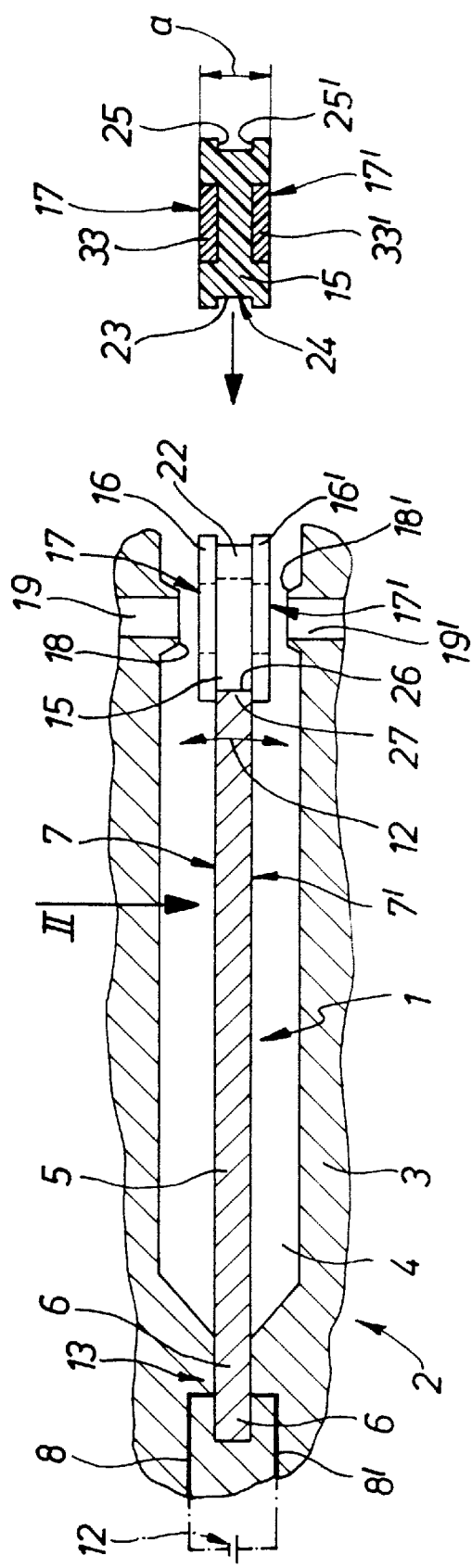
FIG. 3 illustrates a longitudinal section taken through the control member of FIG. 2 on the line III—III, housing components of a piezo-valve provided with the control member and the sealing body being illustrated in cross section prior to fitting and in a lateral view following fitting.

All figures of the drawing show a control member 1, which is able to be employed in piezo-valves. FIG. 3 shows as an example some further components of such piezo-valve 2, which as a rule has a housing 3 defining an inner space 4, wherein the control member 1 extends.

The control member 1 contains an elongated tabular flexible element 5 with a preferably rectangular outline which at one of its two axial ends—in the following referred to the rear end 6—is clamped in relation to the housing. Its two mutually opposite longitudinal side faces 7 and 7' which are represented by large longitudinal plate faces turned away from each other, are contacted by electrical conductors 8 and 8' so that by means of a power source 12 as indicated in chained lines a voltage may be applied, which causes a pivotal movement 12, indicated by a double arrow, in relation to the point 13 of fixation on the housing, of the flexible element.

At the other axial end, opposite to the rear end 6, of the flexible element 5—such end being referred to in the following as the front end 14—a sealing body 15 is secured. Such body contains two disk- or plate-like sealing elements 16 and 16', which from opposite sides abut the two longitudinal side faces 7 and 7' of the flexible element 5. Each sealing element 16 and 16' comprises a sealing face 17 and 17' turned away from the flexible element 5, such face being opposite an annular valve seat 18 and 18' on the housing and which surrounds the opening or port of a fluid duct 19 and 19' extending in the housing 3.

By pivoting the control member 1 it is possible for the one or the other of the sealing faces 17 and 17' to be applied to the valve seat 18 and 18' opposite to it so that the port of the associated fluid duct 19 and 19' is closed. Simultaneously with this the oppositely oriented other sealing face is moved clear of the valve seat facing same so that the port of the associated fluid duct is cleared and fluid flow may take place. If the piezo-valve 2 is a 3/2 way valve, it is possible for a further fluid duct (not illustrated) to open into the inner space 4, such duct being able to be connected with one of the two above mentioned fluid ducts 19 and 19' in a manner dependent on the pivotal setting of the control member. It would also be possible to have a design with a 2/2 way valve, a switching position as indicated FIG. 3 being possible, in which both sealing faces 17 and 17' are moved clear of the associated valve seat 18 and 18' so that a fluid, as for example compressed air, may be transferred through the inner space 4 between the two fluid ducts 19 and 19'. In order to interrupt the fluid connection in this case the one of the sealing faces 17 and 17' sealing body 15 is thrust against one of the valve seats 18 and 18'.

The two sealing elements 16 and 161 are connected integrally by means of a connecting section 22 arranged between them of the sealing body 15, the cross section of the connecting section 22 being smaller than that of the two sealing elements 16 and 16' so that sealing body 15 on the whole possesses a block- or disk-like shape and has an surrounding annular groove 23. The floor 24 of the groove 23 is constituted by the peripheral face of the connecting section 22 and the two groove flanks are formed by the marginal region, overlapping connecting section 22, of the sealing elements 16 and 16'. The width, as measured between the groove flanks 25 and 25', of the annular groove 23 is best made the same as the thickness, as measured between the longitudinal side faces 7 and 7', of the flexible element 5 at the attachment point of the sealing body 15.

At the attachment point of the sealing body 15 the flexible element 5 possesses a through opening 26 between the longitudinal side faces 7 and 7'. When the sealing body 15 is mounted the connecting section 22 extends through the opening 26, whereas the two sealing elements 16 and 16' overlap the marginal section 27 (which peripherally delimits the opening 26) of the flexible element 5 and furthermore in the peripheral region of the opening 26 rest against the respectively associated longitudinal side faces 7 and 7' of the flexible element 5.

Figure 1:
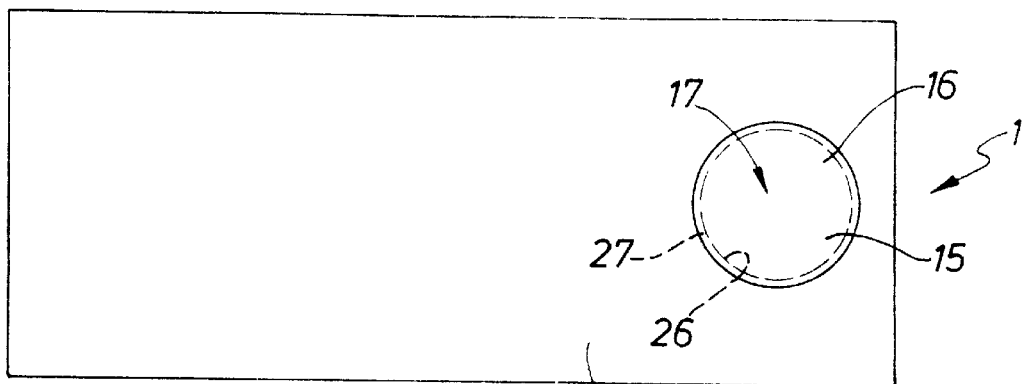
FIG. 1 shows a first design of the control member of the invention in a plan view looking toward one of the longitudinal side faces of the flexible element.

In the working embodiment of FIG. 1 the opening 26 is in the form of a hole which is peripherally complete and without any slot opening into it and into which the sealing body 15 is buttoned or snap fitted, such body 15 preferably consisting of a material with rubber-like properties.

Figure 2:
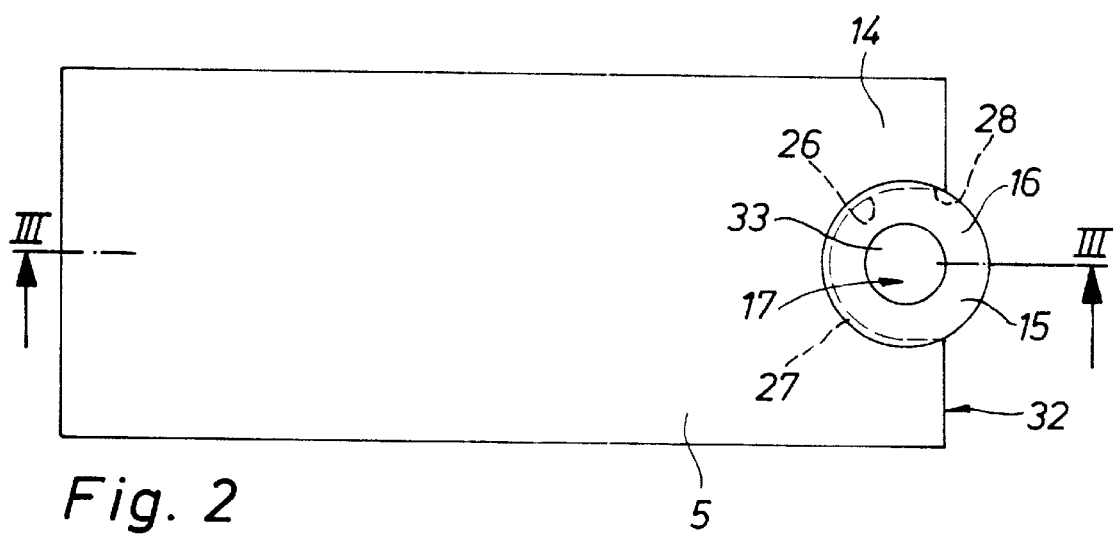
FIG. 2 shows a further design of the control member in a view corresponding to that of FIG. 1, the direction of sight being indicated in FIG. 3 by the arrow II.

As a departure from this in the case of the working examples of FIGS. 2 such 4 there is the provision that the opening 26 is open or interrupted at the relatively narrow edge of the flexible element 5, the marginal interruption 28 preferably being on the axially orientated end face 32 of the front end 14 of the flexible element 5. The opening 26 is in this case thus produced as a sort of cut or recess in the front end face 32.

The production of the opening 26 is furthermore preferably facilitated in all embodiments because the electrodes (which are in electrical contact with the conductors 8 and 8' and are not illustrated in detail in the drawing) of the flexible element possess a suitably adapted configuration.

The marginal interruption 28 into the opening 26 renders possible simple assembly by plugging in of the sealing body 15 from the axial front side of the flexible element 5. In this case there is preferably a provision such that the width, as measured in the plane of extension of the flexible element 5 athwart its longitudinal direction, of the marginal interruption 28 corresponds to the transverse dimensions of the connecting section 22. The arrangement should as far as possible be such that on introduction of the sealing body 15 into the opening 26 in the flexible element 5, the distance "a" present before fitting between the two sealing face 17 and 17' remains unchanged. Thus in the case of manufacture of the sealing body 15 taking place separately from that of the flexible element 5 it is possible to ensure an accurate distance "a", which even after fitting to the flexible element 5 will not be changed so that one the whole exact manufacture is possible with extremely small inaccuracies.

During fitting of the sealing body 15 by plugging into the opening 26 the flexible element's marginal section 27, which delimits the opening 26, fits into the annular groove 23 on opposite sides so that the sealing body 15 may be readily slipped on in the correct setting. Once the sealing body 15 has reached its terminal position, it is both mechanically interlocked and held in the transverse direction of the flexible element 5 and also in the thickness direction thereof and is relatively securely fixed in place just by this. In this respect conventionally used rubber-like material for the sealing body 15 will permit dimensions such that the two sealing elements 16 and 16' engage the flexible element 5 with an at least slight bracing or biasing effect so that there is also a certain degree of non-positive or frictional holding action as well. It is however convenient to have an additional adhesive bond between the sealing body 15 and the flexible element 5 for final attachment.

In the working embodiments illustrated in FIGS. 1 through 3 the connecting section 22 possesses a cylindrical shape and furthermore the sealing elements 16 and 16' as well have a circular outline. In the case of the design of FIG. 1 the diameter of the opening 26 is the same as that of the connecting section 22. In the working embodiment of FIGS. 2 and 3 the opening 26 possesses a U-like shape, the marginal interruption 28 being located in the U-like region and the radius of the U-like region being the same as that of the connecting section 22 so that same may make snug engagement with the edge of the interruption 26.

Figure 4:
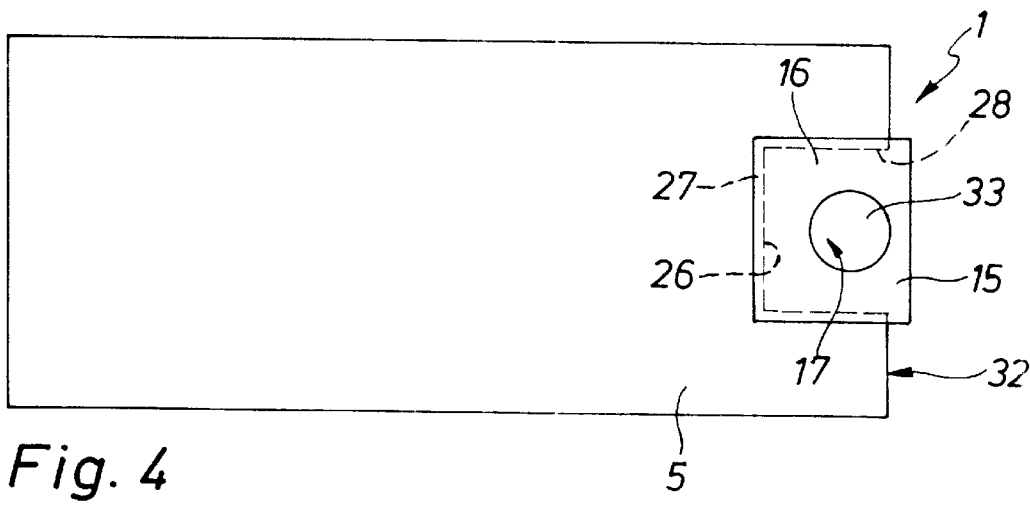
FIG. 4 shows a further possible design of the control member in a view corresponding to FIG. 2, the sealing elements having a different configuration.

In the working embodiment of FIG. 4 both the interruption 26 and also the connecting section 22 is rectangular and more especially square in shape. Furthermore the sealing elements 16 and 16' possess a rectangular and more particularly square outline.

FIGS. 2 through 4 furthermore serve to make it clear that the depth as measured in the longitudinal direction of the flexible element 5 may readily be selected so that in its fitted state the sealing body 15 has a portion of its periphery extending past the front end face 32 of the flexible element 5 axially.

The sealing faces 17 and 17' can be directly formed on the respectively associated sealing element 16 and 16', as is indicated by way of example with reference to FIG. 1. In this case the sealing body 15 including the sealing faces 17 and 17' constitutes a preferably integral body, which is preferably made of plastic material and more especially has rubber-like properties.

In the case of an alternative design as is indicated with reference to FIGS. 2 through 4, the sealing faces 17 and 17' are a component of separate sealing face parts 33 and 33', which are secured in a permanent manner on the sealing body 15 adjacent to the sealing elements 16 and 16'. The attachment of the sealing face parts 33 and 33' may for instance be by adhesive bonding, or more preferably, in the case of production by injection molding of the sealing body 15, by having material of the sealing body injected partly around same. In any case it is preferred to use a design in the case of which the sealing face parts 33 and 33' are flat disk bodies, which are embedded or let into the external face, turned toward valve seat 18 and 18', in the associated sealing element 16 and 16' at least partially. In the case of the embodiments of FIGS. 2 through 4, the sealing faces 17 and 17' provided on the sealing face parts 33 and 33' are in a common plane with the region surrounding the sealing face parts 33 and 33', of the sealing body 15.

The separate design of the sealing faces 17 and 17' does offer the advantage that the material of the sealing body 15 may be selected as regards its holding function and the material of the sealing face parts 33 and 33' 15 may be selected as regards its sealing function to be performed without having to make any compromise. It is convenient for both the sealing body and also the sealing face parts 33 and 33' to be manufactured of plastic material, whose hardness and elasticity may be selected as desired.

What is claimed is:

1. A control member for a piezo-valve comprising:

an elongated flexible element, said flexible element having a peripheral edge, a first longitudinal side face, an oppositely positioned second longitudinal side face, and an opening defined by a marginal section, said opening extending through said first and second longitudinal side faces, said opening having a marginal interruption, said marginal interruption extending from said marginal section of said opening to said peripheral edge to form a recess in said flexible element for receiving a sealing body; and said sealing body having a first sealing element having a first sealing face, a second sealing element having a second sealing face, said first sealing element and said second sealing element positioned on opposite longitudinal side faces of said flexible element, a connecting section extending between said first sealing element and said second sealing element through said opening, said connecting section being integrally formed with said first sealing element and said second sealing element, and said first sealing element and said second sealing element extending past said marginal section of said opening.

2. The control member as set forth in claim 1, wherein at least one sealing face is formed directly on the associated sealing element.

3. The control member as set forth in claim 1, wherein said flexible element further includes a rear end and an axially adjacent front end, said open portion of said opening is directed toward the adjacent axially orientated front end of the flexible element.

4. The control member as set forth in claim 1, wherein the sealing body is adhesively bonded to the flexible element.

5. The control member as set forth in claim 1, wherein the first sealing element and the second sealing element engage the flexible element with a friction fit.

6. The control member as set forth in claim 1, wherein the sealing body possesses a surrounding annular groove, whose floor is constituted by the peripheral face of the connecting section and whose flanks are constituted by the sealing elements.

* * * * *